United States Patent
Rigsby et al.

(10) Patent No.: US 6,556,971 B1
(45) Date of Patent: Apr. 29, 2003

(54) COMPUTER-IMPLEMENTED SPEECH RECOGNITION SYSTEM TRAINING

(75) Inventors: Stephen Rigsby, Conway, AR (US); Donald L. Walchuk, Conway, AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 264 days.

(21) Appl. No.: 09/653,989

(22) Filed: Sep. 1, 2000

(51) Int. Cl.$^7$ .............................................. G10L 21/06
(52) U.S. Cl. ........................... 704/270; 704/275; 33/286
(58) Field of Search ................................. 704/270, 275; 709/229, 219; 701/33; 33/286; 345/8

(56) References Cited

U.S. PATENT DOCUMENTS

| | | | |
|---|---|---|---|
| 4,509,133 A | 4/1985 | Monbaron et al. | ........ 364/513.5 |
| 4,827,520 A | 5/1989 | Zeinstra | ........ 381/43 |
| 4,931,964 A | 6/1990 | Titsworth et al. | ........ 364/559 |
| 5,335,420 A * | 8/1994 | Kling, III et al. | ........ 33/288 |
| 5,345,538 A | 9/1994 | Narayannan et al. | ........ 704/275 |
| 5,379,366 A * | 1/1995 | Noyes | ........ 395/54 |
| 5,859,628 A * | 1/1999 | Ross et al. | ........ 345/173 |
| 6,085,428 A | 7/2000 | Casby et al. | ........ 33/286 |
| 6,088,731 A * | 7/2000 | Kiraly et al. | ........ 709/229 |
| 6,330,499 B1 * | 12/2001 | Chou et al. | ........ 701/33 |

FOREIGN PATENT DOCUMENTS

| | | |
|---|---|---|
| DE | 4435484 A1 | 4/1995 |
| EP | 0965978 A1 | 12/1999 |

OTHER PUBLICATIONS

"Easy Navigate Task List by Voice", IBM Technical Disclosure Bulletin, IBM Corp. New York, US, vol. 40, No. 5, May 1, 1997, p. 81.

"Integrated Audio–Graphics User Interface", IBM Technical Disclosure Bulletin, IBM Corp. New York, US, vol. 33, No. 11, Apr. 1, 1991, pp. 368–371.

\* cited by examiner

*Primary Examiner*—Susan McFadden
(74) *Attorney, Agent, or Firm*—McDermott, Will & Emery

(57) ABSTRACT

Computer-implemented speech recognition system training including displaying an icon representing a concept, prompting a user to generate a vocalization comprising any sound determined by the user to associate to the icon, confirming association of the vocalization with the icon, and saving the association of the vocalization with the icon to a computer readable medium. The invention has particular applicability, but is not limited, to the field of vehicle diagnostics including vehicle wheel alignment or vehicle engine diagnostics.

20 Claims, 7 Drawing Sheets

COMPUTER-IMPLEMENTED SPEECH RECOGNITION SYSTEM TRAINING

BACKGROUND OF THE INVENTION

1. Field of the Invention

The present invention relates to training a speech recognition system and, more particularly, to computer-implemented speech recognition system training to associate a user selected vocalization to a concept represented by an icon.

2. Description of Related Art

In the field of speech recognition, many methods have been implemented to correlate an utterance or vocalization of a user to a reference vocalization pattern. The reference vocalization patterns are typically created during a "training session" prior to use of the speech recognition system in the intended environment. In the training session, existing speech recognition training systems prompt a user to utter into a microphone a vocalization corresponding to a specific word displayed on a screen. The vocalization is converted by an analog to digital converter and appropriate electronics, such as filters and amplifiers, into a signal which is processed by the software into a representative waveform or vector, as understood by those skilled in the art. For example, the vocalization could be transformed into multi-dimensional vectors by utilizing Fourier transforms to develop a series of frames representing digital values of the spectral features of the vocalization over specific units of time.

Speech recognition systems are employed, for example, in manufacturing, repair, avionics, and medical applications where it is important for a user to have his or her hands free to perform a manual task while simultaneously performing a second manual task which may be carried out by a computer controlled machine or device. Using a microphone, the user performing a first task can control one or more designated systems without diverting time and/or attention to separately performing each of the additional tasks. This type of system is used in automotive applications to allow a user to control devices such as a lift or jack connected to a computer. This type of system is also used in a vehicle wheel alignment process, providing feedback and sensor data to guide a user to make adjustments necessary to bring the vehicle into conformance with specified alignment values.

Conventional software applications, including speech recognition applications, increasingly employ icons as a graphic shorthand for a concept or predefined set of program instructions. Thus, a user would know that when an icon is clicked or selected, a predefined event or sequence of events will occur. Frequently, a tag or text box is disposed immediately adjacent an icon to provide an additional clue to the meaning of the concept represented by the icon. The tag or text box is particularly relevant in speech recognition applications, wherein the software and computer must be trained to relate a spoken command of the user to the desired icon. Conventionally, the user repeats the specific word or words displayed adjacent the icon, whether actually required by the software or required simply to avoid confusion. For example, for an icon having the appearance of a floppy disk disposed adjacent a tag reading "save", the user will train the software to recognize the users utterance of "save". Thus, the user is restrained from using other vocalizations or words that might carry greater significance or meaning to that user, a problem which becomes more relevant as the nature of the concept represented by an icon becomes more abstract and less easily defined.

Further, adaptation of these speech recognition systems to foreign languages can be troublesome, requiring modification to both the software display as well as the relational language database adding additional cost and complexity to the system. In the event a separate language database (e.g., Japanese) is not available, persons not fully proficient in the base language (e.g., English) may experience difficulty comprehending and/or pronouncing the reference words and suffer a loss of productivity. The reference words may also pose a mnemonic challenge to non-native speakers further compromising productivity, particularly as the associated phrases and tasks become more complex.

In extreme cases, individuals may not be proficient in reading their native language or may suffer from speech impediments, presenting additional obstacles to training and implementing a speech recognition control system based solely on a correspondence between a specified word and corresponding actions. Even barring such difficulties, it is not always easy to relate a desired effect or outcome to an externally imposed definition of the desired effect or outcome. In other words, a software designer's definition or shorthand concept of an action or sequence of actions may not precisely correspond to a user's internal definition of the same action or sequence of actions, based on the user's own experience base. Thus, the potential exists for mnemonic inconsistencies manifested in an inability of the user to recall specific software imposed relationships, requiring undesirable diversion of the user's attention from a task at hand.

Thus, a need exists for training a speech recognition system that is substantially language insensitive and conformable to individual users.

SUMMARY OF THE INVENTION

The invention provides, in various aspects and embodiments, computer-implemented training of a speech recognition system to associate a user selected vocalization to a concept represented by an icon to fill the needs identified above.

In one aspect, a method for training a computer implemented speech recognition system includes displaying an icon representing a concept and prompting a user to generate a vocalization comprising any sound determined by the user to associate to the icon. The method also includes confirming association of the vocalization with the icon and saving the association of the vocalization with the icon to a computer readable medium.

In another aspect, a computer-readable medium bears instructions enabling a computer to associate a sound made by a user to a concept associated with an icon selected by the user, where the sound may include any sound or combination of sounds the user wants to relate to the icon. The instructions relate the sound made by the user to a concept or instruction set associated with a selected icon. Then, the sound and the relationship between the sound and the icon's concept are stored. Further instructions may compare a subsequent user's sound to the stored sound to determine if the subsequent sound corresponds to the stored sound. If a correspondence exists, the relationship between the stored sound and the icon's concept is used to execute an instruction set corresponding to the identified icon.

In still another aspect, a computer-based vehicle diagnostics system includes a speech recognition program product configured to process, in combination with a computer processor, a signal provided to the processor by a sound-to-signal transducer, such as a microphone, and relate a concept represented by an icon displayed on a display to any sound determined by the user.

These and other aspects and advantages of the invention will be apparent to those skilled in the art from the following detailed description and accompanying drawings.

DESCRIPTION OF THE PREFERRED EMBODIMENTS

Speaker enrollment and training of speech recognition software permits a user to efficiently multi-task utilizing voice commands to enter data, receive data, and operate devices through a computer without diverting excessive time or attention from a task at hand. For example, in operation of a vehicle wheel aligner, alignment values calculated from measurements obtained from sensors are compared to required alignment values in accord with vehicle specifications in a manner known to those skilled in the art. In accord with the method and system described herein, a computer-implemented speech recognition system is configured to associate a user-selected vocalization to a concept represented by an icon output to a display.

Figure 1:
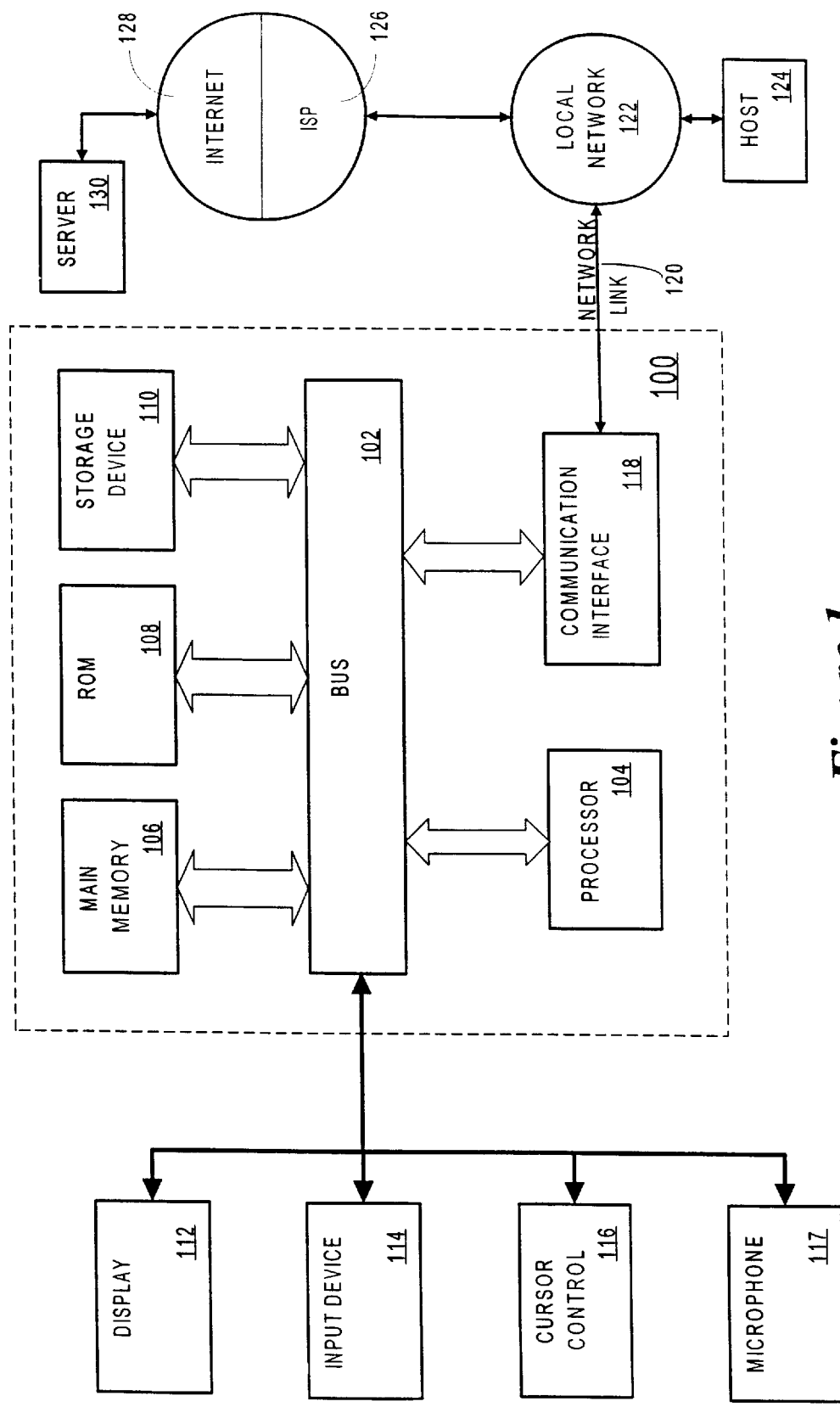
FIG. 1 is a block diagram depicting a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor or processors 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

A computer system 100 is used to train a speech recognition system to associate a user-selected vocalization to a concept represented by an icon displayed by the computer system. In accord therewith, training a speech recognition system to associate a user selected vocalization to a concept represented by an icon is provided by computer system 100 in response to processor 104 executing one or more sequences of one or more instructions contained in main memory 106. Such instructions may be read into main memory 106 from another computer-readable medium, such as storage device 110.

Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions and it is to be understood that no specific combination of hardware circuitry and software are required.

The instructions may be provided in any number of forms such as source code, assembly code, object code, machine language, compressed or encrypted versions of the foregoing, and any and all equivalents thereof. "Computer-readable medium" refers to any medium that participates in providing instructions to processor 104 for execution and "program product" refers to such a computer-readable medium bearing a computer-executable program. The computer usable medium may be referred to as "bearing" the instructions, which encompass all ways in which instructions are associated with a computer usable medium.

Computer-readable mediums include, but are not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102 to provide a two-way data communication coupling to a network link 120 connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information. Thus the processing required by method of the invention described by way of example herein may be implemented on a local computer utilizing storage device 110 or may be implemented, for example, on a LAN or over the internet.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for training a speech recognition system to associate a user selected vocalization to a concept represented by an icon as described herein. The received code may be executed by processor 104 as it is received, and/or stored in storage device 110, or other non-volatile storage for later execution. In this manner, computer system 100 may obtain application code in the form of a carrier wave.

In operation, a user utters a vocalization into a sound-to-signal transducer or microphone 117, such as the wearable "DCNC" headset available from the David Clark Company of Worchester, Massachusetts. Alternatively, one or more fixed microphones 117 may be disposed adjacent the work site or the computer 100. The system may include a hard-wired transceiver for transmitting and receiving communications between microphone 117 and console 100. Alternatively, communication between a user, computer 100 implementing the method of the invention, and the software facilitating the method of the invention stored in main memory 106 or storage device 110, for example, may be accomplished by a high-frequency wireless device of the type generally known in the art, such as the Ellipse™ model manufactured by GNNetcom™ based in Germany. This device communicates with a corresponding transceiver located in the console. The signal may be appropriately encoded for transmission by conventional data transmission means including electrical, electromagnetic, or optical signal transmission and transmitter by a transmitter to a received associated with computer 100.

To facilitate interaction between the user and computer 100 while preserving the user's freedom of movement, the user may be provided with data via a portable or wearable display 112, such as a heads-up display operatively associated with glasses or a visor including, for example, the "Mobile Assistant IV"™ made by Xybernaut™ of Fairfax, Va., to assist the user in implementing the method of the invention, discussed below. Another suitable wearable display includes the "Virtual Vision Sport" or the "eGlass" portable monitors available from Virtual Vision, Inc. of Redmond Washington. The method of speech recognition training, described below, may also be implemented by a conventional CRT display, flat panel display (including, for example, a LED, LCD, and LCOS (liquid crystal on silicon) display), or projected image. The selected display means displays data and information output from computer 100 based on the user's vocalization.

Figure 2:
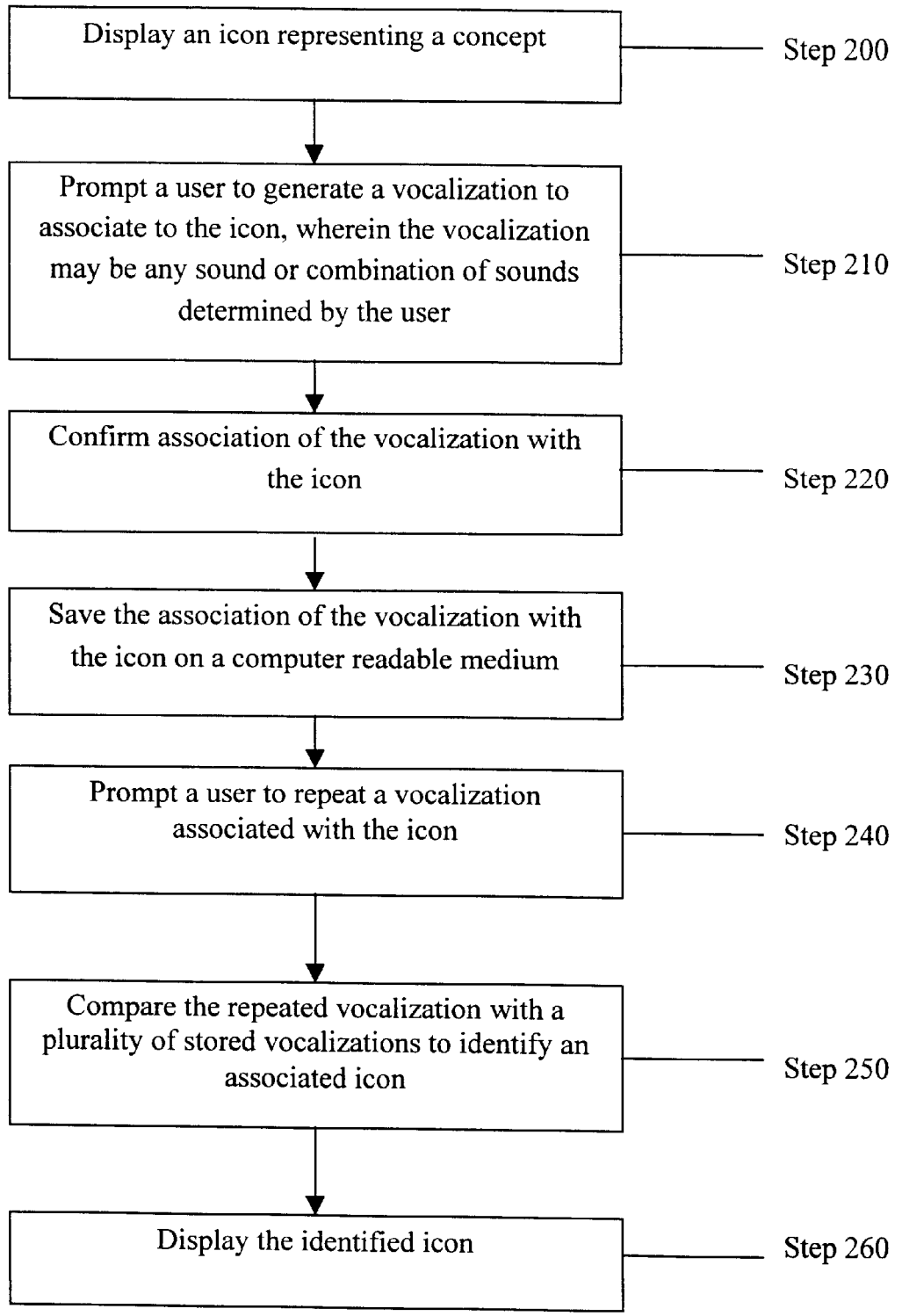
FIG. 2 is a block diagram of a method in accord with the invention.

Automatic Speech Recognition (ASR) software from Lernout&Hauspie™, of Belgium, such as the L&H PCMM ASR version 1500 or 1600, may be used in conjunction with the above system to implement a method in accord with the invention, depicted by way of example in FIG. 2. In Step 200, at least one icon representing a concept is displayed to the user, wherein the concept represented by the icon may reside in a set of instructions executable by a computer.

Figure 3:
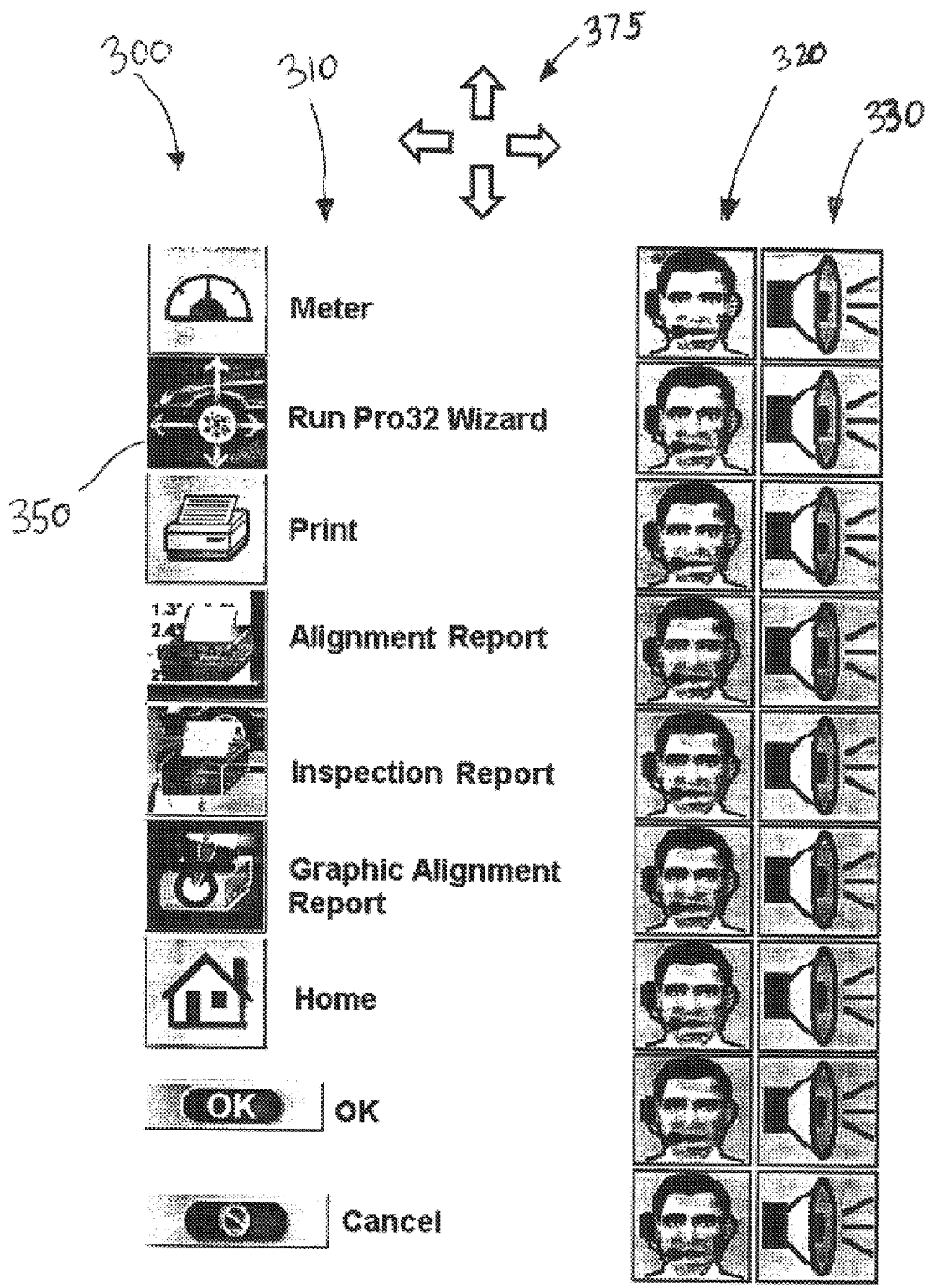
FIG. 3 illustrates a display representing a step in the method of FIG. 2.
Figure 4A:
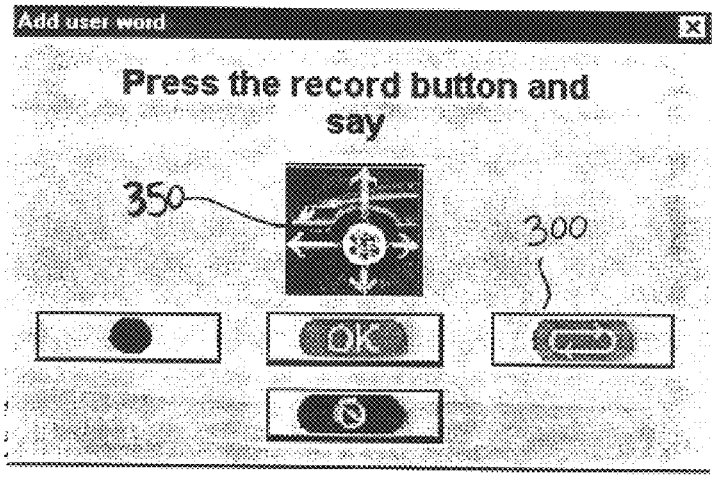
FIGS. 4(a)–4(e) illustrate displays representing additional steps in the method of FIG. 2.
Figure 4B:
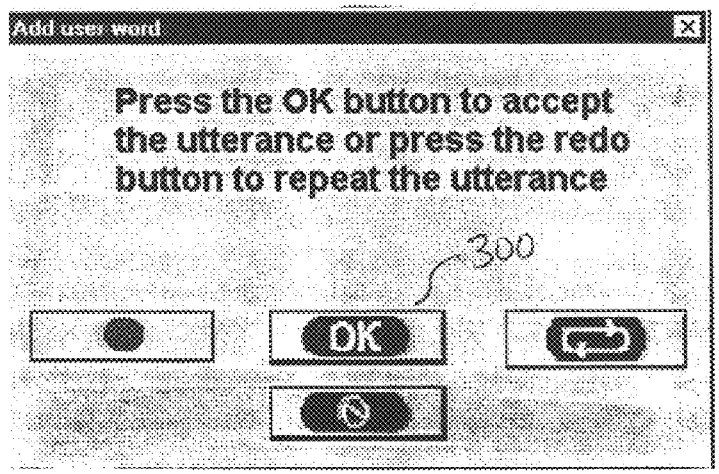
Figure 4C:
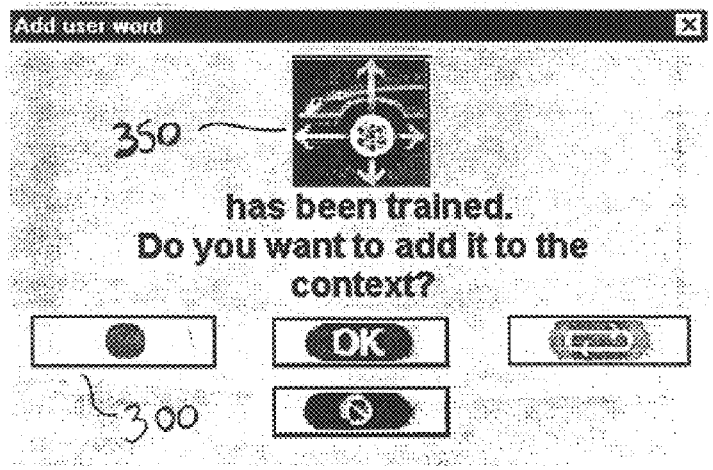
Figure 4D:
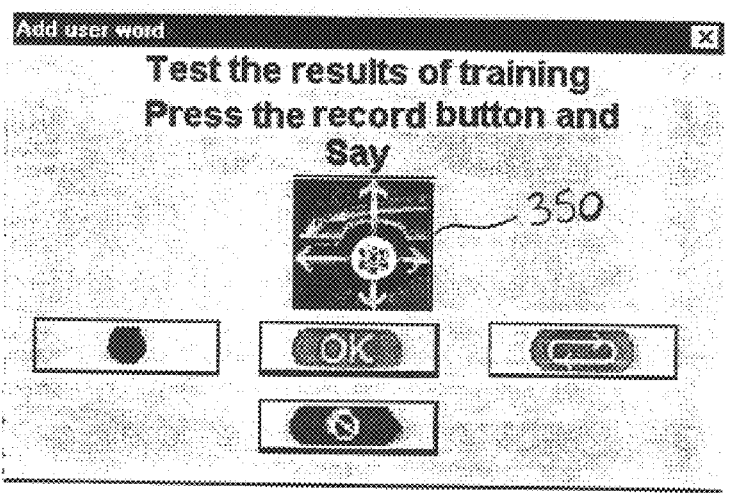
Figure 4E:
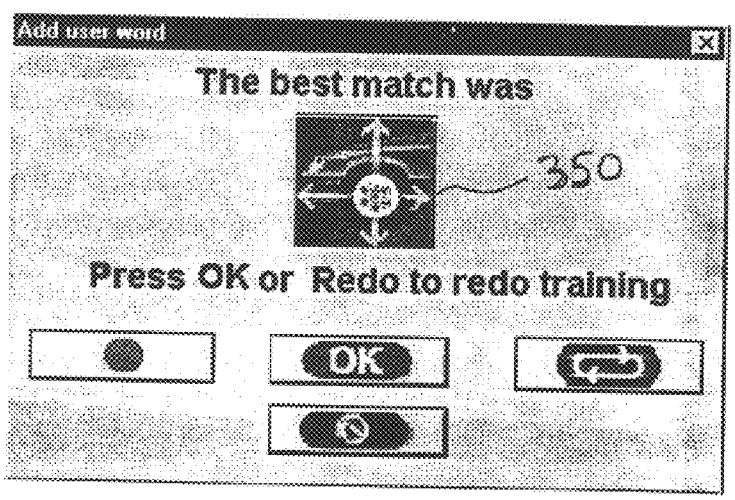
Figure 5:
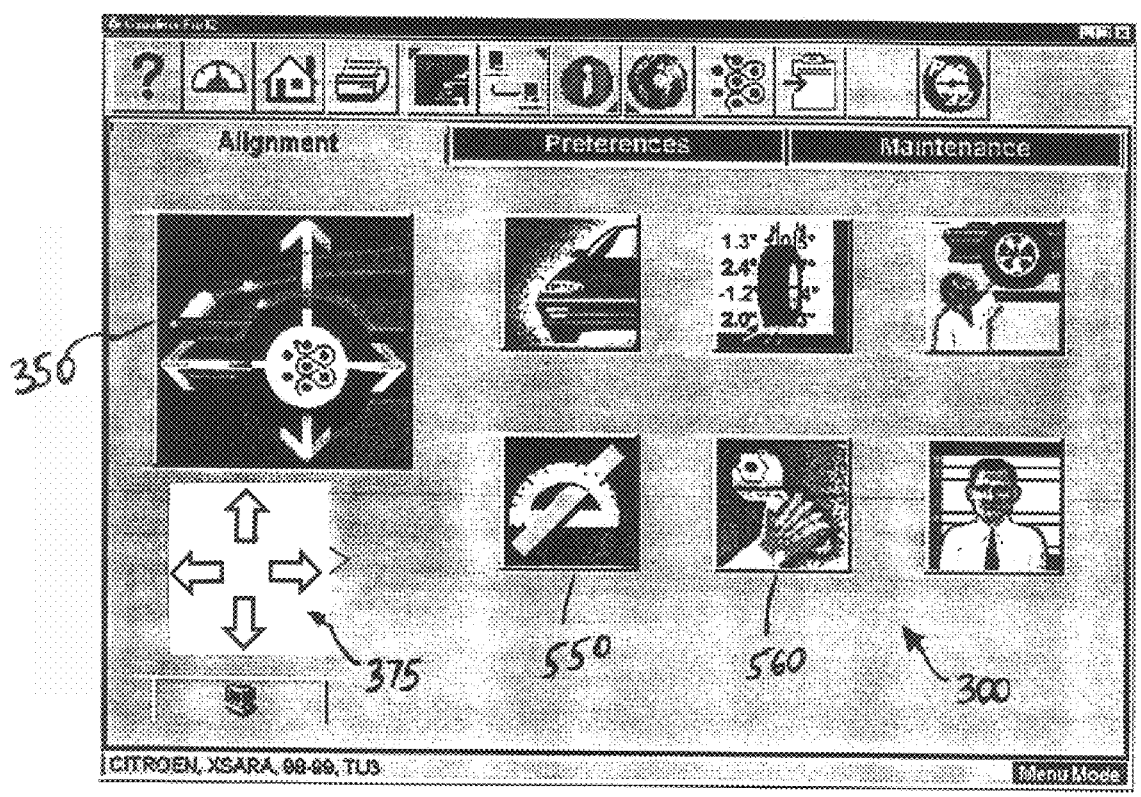
FIG. 5 depicts a display containing a plurality of icons representing different concepts.

Step 200 is illustrated in FIG. 3, which depicts a start-up speaker enrollment screen displaying a plurality of icons 300, each icon graphically suggestive of the concept represented by the icon. For example, icon 350 represents a complete vehicle alignment sequence. As shown in FIG. 5, other icons include, but are not limited to icon 550, representing transfer to a screen containing a plurality of icons relating to performance of specific measurements, and icon 560 representing transfer to an adjustments screen containing a plurality of icons relating to the performance of adjustments.

In FIG. 3, a title 310 is optionally displayed next to each icon 300 to textually convey the concept represented by the icon to provide additional guidance to the user performing the training of the speech recognition program. Icons depicting a man wearing a headset 320 and a speaker 330, by way of example, are also displayed. These icons are used to initiate enrollment of the selected icon 300 and to permit replay of a vocalization recorded for the selected icon, respectively. Although a plurality of icons 320, 330 are shown, a single icon may be provided for each of the functions provided by icons 320, 330.

The user may begin the speaker enrollment process by selecting an icon 350, such as by clicking on the icon with a mouse, and then selecting icon 320 to initiate speaker enrollment of the icon. Alternatively, the speaker enrollment process, and any application associated therewith, may be keyed to voice-responsive navigation keys or icons 375. These navigation keys include, for example, "navigate", "left", "right", "up", "down", and "enter", several of which are depicted in FIGS. 3 and 5. Navigation keys 375 may correspond to predetermined textual voice commands, such as "left" or "right". Alternatively, navigation keys may be associated with vocalizations or sounds selected by the user using the procedure described below for enrollment of icons 300.

Following selection of an icon 300, the user is prompted in Step 210 to generate a vocalization to associate with the selected icon 350, as shown in FIG. 4(*a*). The user's vocalization is not limited to any specific words, sounds, or language. In other words, the user is not constrained to relate a predetermined word to the selected icon 350 and the user may relate thereto a vocalization including any audible sound or combination of sounds. For example, although the title 310 is "Run Pro32 Wizard", the user may utter "Start Wheel Alignment" or "Anfang Rad Ausrichtung" or any other sound or combination of sounds desired. The vocalization is stored in main computer memory 106, storage device 110, or on a LAN 122 or server 130 storage device and is converted into one or more representative waveforms or spectral feature vectors (frames) utilizing methods known to those skilled in the art including but not limited to Pulse Code Modulation and Fourier Transform operations. The precise method of storing and converting the vocalization is not central to the inventive concepts expressed herein and it is only necessary that the methods and devices used to store and convert the vocalization permit the user to relate a vocalization including any audible sound or combination of sounds to a displayed icon.

Step 220 confirms association of the vocalization with the selected icon 350. It is preferred, but not necessary, that the user utter the vocalization at least two additional times to ensure proper sampling and analysis of the vocalization waveform by the speech recognition software to account for slight variances in the selected vocalization. Each of these vocalizations may be individually saved to a database and related to the selected icon for individual retrieval and comparison to a subsequent vocalization, or may be combined into a representative vocalization using methods known to those skilled in the art. Multiple iterations of the vocalization may be used to generate an individualized error function from the observed variances among the multiple iterations, which can then be applied to subsequent vocalizations to account for natural variances in the users' voice. It is also possible to accommodate a single vocalization wherein the speech recognition software may apply a generalized signal-processing algorithm adapted to account for predetermined levels of variance in a vocalization waveform. After the vocalization has been repeated a requisite number of times, the user confirms the association of the vocalization with the icon 350 by clicking, or saying, "OK" as shown in FIG. 4(*b*).

Step 230 permanently saves the association of the vocalization with the icon in an appropriate computer-readable medium, such as in a relational database having stored vocalizations and pointers relating the stored vocalizations to executable program instruction sets and concepts represented by various icons. As shown in FIG. 4(*c*), the user is provided an opportunity to permanently add the vocalization associated with the icon to a database.

Additional steps may be included, such as Step 240, shown in FIG. 4(*d*), prompting a user to repeat a vocalization associated with the selected icon. This repeated vocalization is compared, in Step 250, with the saved vocalization using conventional methods known those skilled in the art. Finally, as shown in FIG. 3(*e*), the identified icon 350 is displayed to the user, confirming a successful match between the icon 350 and vocalization.

During use of an application such as the vehicle wheel alignment application depicted in FIGS. 2–5 trained in accord with the above discussion, the user may select any icon on a display displaying one or more icons by uttering the vocalization that the user previously trained the application to recognize as indicating selection of that icon. Thus, an innovative method for training the system to recognize a user's vocalization and associate that vocalization to a particular concept represented by an icon is provided, as generally illustrated in FIG. 2.

In the event a vocalization attempt during an application is not successful in activating the desired concept represented by an icon, navigation keys 375 may be used in conjunction with a wearable display, microphone, and appurtenant electronics enabling two way communication with the computer to cycle through icons 300 using navigational commands to highlight and select the desired icon. A user may, for example, select icon 350 for enrollment by saying "navigate" or other equivalent user designated utterance, whereupon an icon 300 at a selected starting point will be highlighted. The user could then select an icon 350 using appropriate navigational commands. Thus, the user can bypass inopportune errors without the need to return to the console or computer 100 to enter the data manually or re-train the software locally.

A method implementing the speech recognition system training may also include adaptation, either automatically or by query to the user, of the previously saved vocalization model to incorporate the unrecognized vocalization. The error function is revised to account for variances between multidimensional vectors representing the unrecognized vocalization and the previously stored vocalization following identification of the appropriate icon by alternate means, such as by navigation keys 375. Thus, the unrecognized vocalization could be transformed into a string of multidimensional vectors or frames representing the spectral features of that vocalization and statistically compared to a previously generated error function incorporating previously saved vocalizations. As noted above, however, the precise methods and devices used to store and convert the user's vocalization are not central to the inventive concepts expressed herein and may include any methods and devices known to those in the speech processing and computer programming fields so long as such methods and devices permit the user to relate a vocalization including any audible sound or combination of sounds to a displayed icon.

Computer-implemented speech recognition system training is also advantageously provided as computer-readable instructions. These instructions are stored on a computer-readable medium, such as a hard disk drive, and relate a sound made by a user to a concept associated with a selected icon, such as icon 350. Both the sound made by the user and the relationship between the stored sound and the concept associated with the selected icon 350 are stored on this computer-readable medium. The user may utter or produce any sound or combination of sounds desired to relate to the concept associated with the selected icon 350. The user is not constrained in the selection of sounds by the software or, in some aspects, suggestive titles 310.

To select a concept represented by a selected icon 350 during subsequent use of an application cooperatively associated with the speech recognition system, the user repeats the desired sound or sounds corresponding to that icon. This subsequent sound is compared to the stored sound to determine if the subsequent sound corresponds to the stored sound by means known to those skilled in the art. If a match is indicated, the concept related to the stored sound is identified based upon the correspondence between the stored sound and the subsequent sound. Following identification of the desired concept, an instruction set corresponding to the concept is executed. The instruction set may include outputting of a control signal.

For example, if a concept represented by an icon could be executed by depressing "ctrl-y" on the keyboard, the software instructions would output a "ctrl-y" command to a processor of interest. Alternatively, the software may output data corresponding to the concept, including the selected icon or operatively related icons flowing from the selected icon, to a wearable display for visually displaying the data in a forward field of view of the user. The software may also output a control signal to a machine to perform a function according to the concept related to the identified stored user vocalization. For example, a control signal may be output to an automotive service system comprising a vehicle diagnostic system, such as a vehicle wheel alignment system or a vehicle engine diagnostics system, as described by way of example below.

Figure 6:
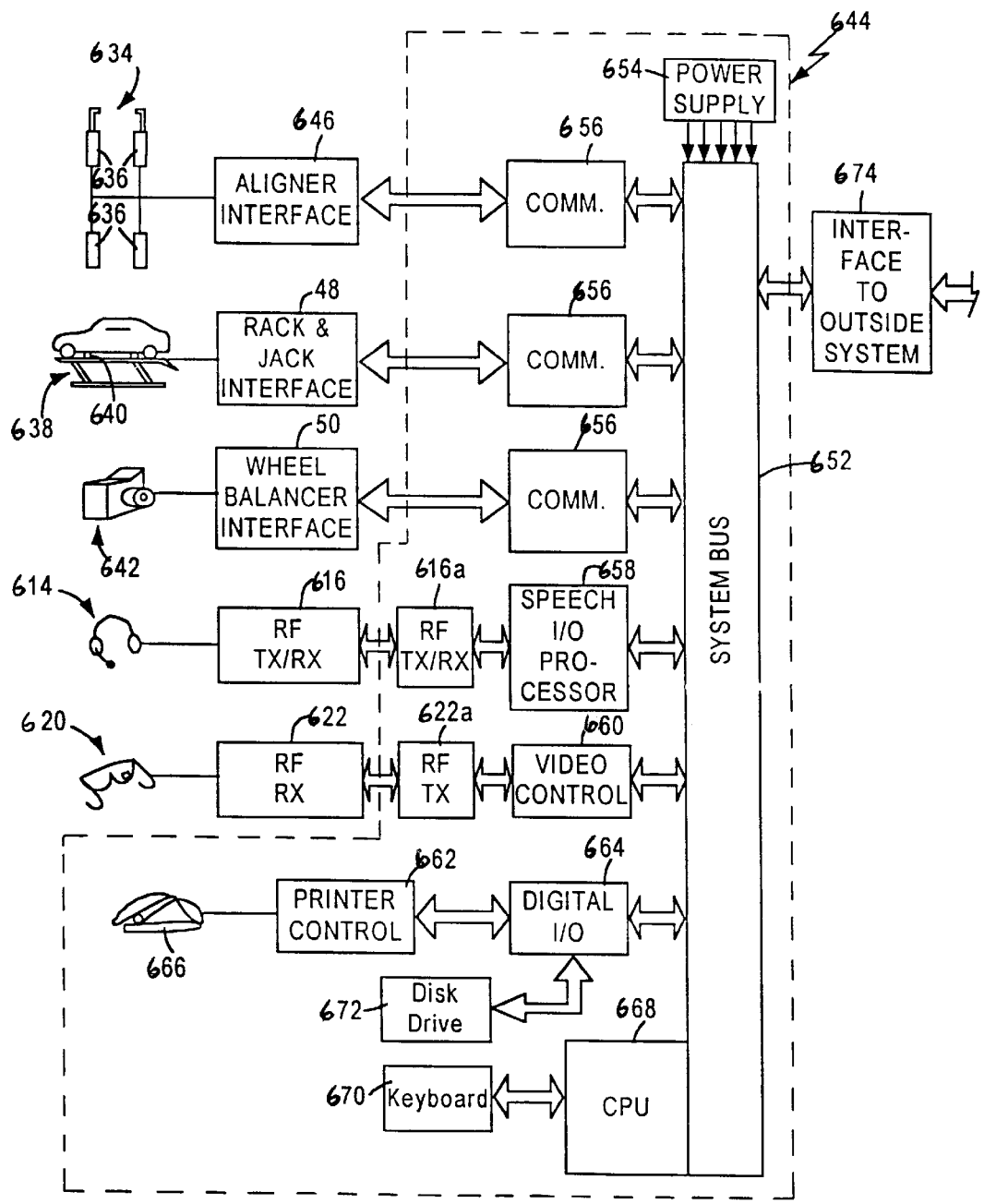
FIG. 6 schematically represents a vehicle wheel alignment system incorporating speech recognition system training in accord with the invention.

One aspect of the foregoing computer-implemented speech recognition system is advantageously provided with a vehicle wheel alignment system. FIG. 6 depicts one possible configuration of such a vehicle diagnostics system including several operational components, such as vehicle wheel aligner 634 having wheel mountable alignment heads 636 containing sensors for measuring an alignment characteristics of a vehicle, such as caster, camber, or toe-in, and generating signals indicative of the alignment characteristic or orientation of each wheel in a manner known to those skilled in the art. The vehicle wheel alignment system also includes a vehicle lift or rack 638, which may include one or more jacks 640, and a wheel balancer 642. Aligner 634, rack 638 and balancer 642 communicate with the console, indicated generally by reference number 644, through appropriate interfaces 646, 648 and 650, respectively, which may be, for example, either electrical wires, wireless radio or infrared transceivers, or fiber optics.

Console 644 comprises a system bus 652 powered by a power supply 654. Power supply 654 can also provide power to a number of functional modules, including a number of communications modules 656 disposed between system bus 652 and an item of automotive service equipment. The communications modules 656 transmit data between the automotive service equipment and system bus 656. Speech processor module 658 is disposed between system bus 652 and a signal-to-sound transducer 614, such as a headset, to provide data from the system bus to the user in the form of pre-recorded or synthesized voice audio. In this aspect, speech processor module 658 is also disposed between system bus 652 and a sound-to-signal transducer 614, such as a microphone, to provide data from the user to the system bus and the computer 668. A display 620, such as a wearable Xybemaut™ display, is also provided to visually output to the user data received from the computer and system bus and through a video control module to convert the data signal into a form suitable for display. A printer control module 662, printer 666, and disk drive 672 are also coupled to the system bus, the coupling using a separate digital I/O means 664 if necessary.

Computer 668 has at least one processor, such as an Intel Pentium III™ or Advanced Micro Devices Athlon™ processor, but may also include multiple processors. Computer 668 is connected to system bus 652 to provide overall control for the automotive service system by performing calculations and managing tasks. Console 644 may optionally include a keyboard 670 and a disk drive 672 through which vehicle data, instructions or the like may be communicated to computer 668. In addition, the system may communicate with external systems through interface 674.

In accord with the above method and system for training a speech recognition, a speech recognition program product is provided to process, in combination with a processor or computer 668, a signal provided to the processor by the user through microphone 614. The speech recognition program product is configured to relate a concept, represented by an icon 300 displayed on the display 614 by the computer 668, to any sound determined by the user. As described above, the user creates a database of sounds respectively correlated to a plurality of icons 300. In operation, digital signals (i.e., subsequent vocalizations) from the microphone 614 are compared to the stored digital signals (i.e., stored vocalizations) in the database until a match is found or until all of the stored vocalizations are processed without a match. When a match is found, computer 668 transmits an instruction, such as a control signal, corresponding to the concept represented by the identified icon to the appropriate component of the vehicle wheel alignment system. For example, computer 668 may provide a control signal to lift 638 and/or jack 640 electrically connected to the computer to raise or lower the lift or jack. Alternately, the concept represented by the selected icon, such as icon 550 or 560, may lead the user to additional screens containing different icons. If no match is found, an error message is sent to the user by computer 668 through a speaker, display, or another light emitting or sound-producing device. If no match is found, the user may optionally elect to utilize the navigation keys 375 to select an appropriate concept or perform speaker enrollment training to re-train the system.

Thus, the above method and system of speech recognition training provides a speech recognition system that is substantially language insensitive and highly conformable to individual users. It should be recognized that, while the invention has been described in relation to the various aspects thereof, the invention encompasses a wide variation of aspects and details as set forth in the appended claims, which are to be construed to cover all equivalents falling within the true scope and spirit of the invention described by way of examples herein.

What is claimed is:

1. A method for training a computer implemented speech recognition system, comprising:
   (a) displaying an icon representing a concept;
   (b) prompting a user to generate a vocalization comprising any sound determined by the user to associate to the icon;
   (c) confirming association of the vocalization with the icon; and
   (d) saving the association of the vocalization with the icon to a computer readable medium.

2. A method for training a computer implemented speech recognition system according to claim 1, wherein the icon represents a concept related to vehicle diagnostics.

3. A method for training a computer implemented speech recognition system according to claim 2, wherein the icon represents a concept related to vehicle wheel alignment.

4. A method for training a computer implemented speech recognition system according to claim 1, wherein said confirming step further comprises:
   prompting a user to repeat the vocalization.

5. A method for training a computer implemented speech recognition system according to claim 4, further comprising:
   (e) prompting a user to repeat a vocalization associated with the icon;
   (f) comparing the repeated vocalization with a plurality of stored vocalizations to identify an associated icon; and
   (g) displaying an identified icon.

6. A method for training a computer implemented speech recognition system according to claim 1, wherein the vocalization is a word or a plurality of words.

7. A computer-readable medium bearing instructions enabling a computer having at least one processor to associate a sound made by a user to a concept associated with a selected icon, the instructions, when executed by a computer, causing the computer to carry out the steps of:

relating a sound made by a user to a concept associated with a selected icon; and storing the sound made by the user as well as the relationship between the stored sound and the concept associated with the selected icon, wherein the sound made by the user may include any sound or combination of sounds.

8. A computer-readable medium bearing instructions according to claim 7, wherein the instructions are further arranged to cause the computer to perform the steps of:

comparing a subsequent sound made by the user to the stored sound to determine if the subsequent sound corresponds to the stored sound; and identifying the concept related to the stored sound based upon the correspondence between the stored sound and the subsequent sound.

9. A computer-readable medium bearing instructions according to claim 8, wherein the instructions are further arranged to cause the computer to perform the step of:

executing an instruction set corresponding to the concept related to the stored user vocalization.

10. A computer-readable medium bearing instructions according to claim 7, wherein the instructions are further arranged to cause the computer to perform the step of:

outputting a control signal to a device connected to the computer, wherein the device changes from a first state to a second state as a result of the control signal.

11. A vehicle diagnostics system comprising:

a computer having at least one processor;

a sound-to-signal transducer configured to output a signal to the processor corresponding to a sound input to the sound-to-signal transducer;

a display configured to receive signals from the processor and display images corresponding to the received signals; and a speech recognition program product configured to process, in combination with the processor, a signal provided to the processor by the sound-to-signal transducer, wherein the speech recognition program product includes instructions relating a concept represented by an icon displayed on the display to any sound determined by the user.

12. A vehicle diagnostics system comprising according to claim 11, wherein the icon represents a concept related to vehicle diagnostics.

13. A vehicle diagnostics system comprising according to claim 12, wherein the sound-to-signal transducer comprises a microphone.

14. A vehicle diagnostics system comprising according to claim 12, wherein the speech recognition program product includes instructions for outputting a control signal corresponding to the concept represented by the identified icon.

15. A vehicle diagnostics system comprising according to claim 12, wherein the icon represents a concept related to vehicle wheel alignment.

16. A vehicle diagnostics system according to claim 15, further comprising a wearable display.

17. A vehicle diagnostics system comprising according to claim 19, further comprising:

a device configured to be controlled by the computer, and wherein the control signal output by the speech recognition program product is used by the processor to change a state of the device from a first state to a second state.

18. A vehicle diagnostics system comprising according to claim 17, wherein the device is at least one of a lift and a jack configured to move up or down in response to a signal output by the computer.

19. A vehicle diagnostics system comprising according to claim 13, a sensor for measuring a vehicle parameter of interest and providing a signal corresponding to the measured parameter of interest to the processor.

20. A vehicle diagnostics system comprising according to claim 12, wherein the icon represents a concept related to vehicle engine diagnostics.

\* \* \* \* \*